United States Patent Office 3,209,354
Patented Sept. 28, 1965

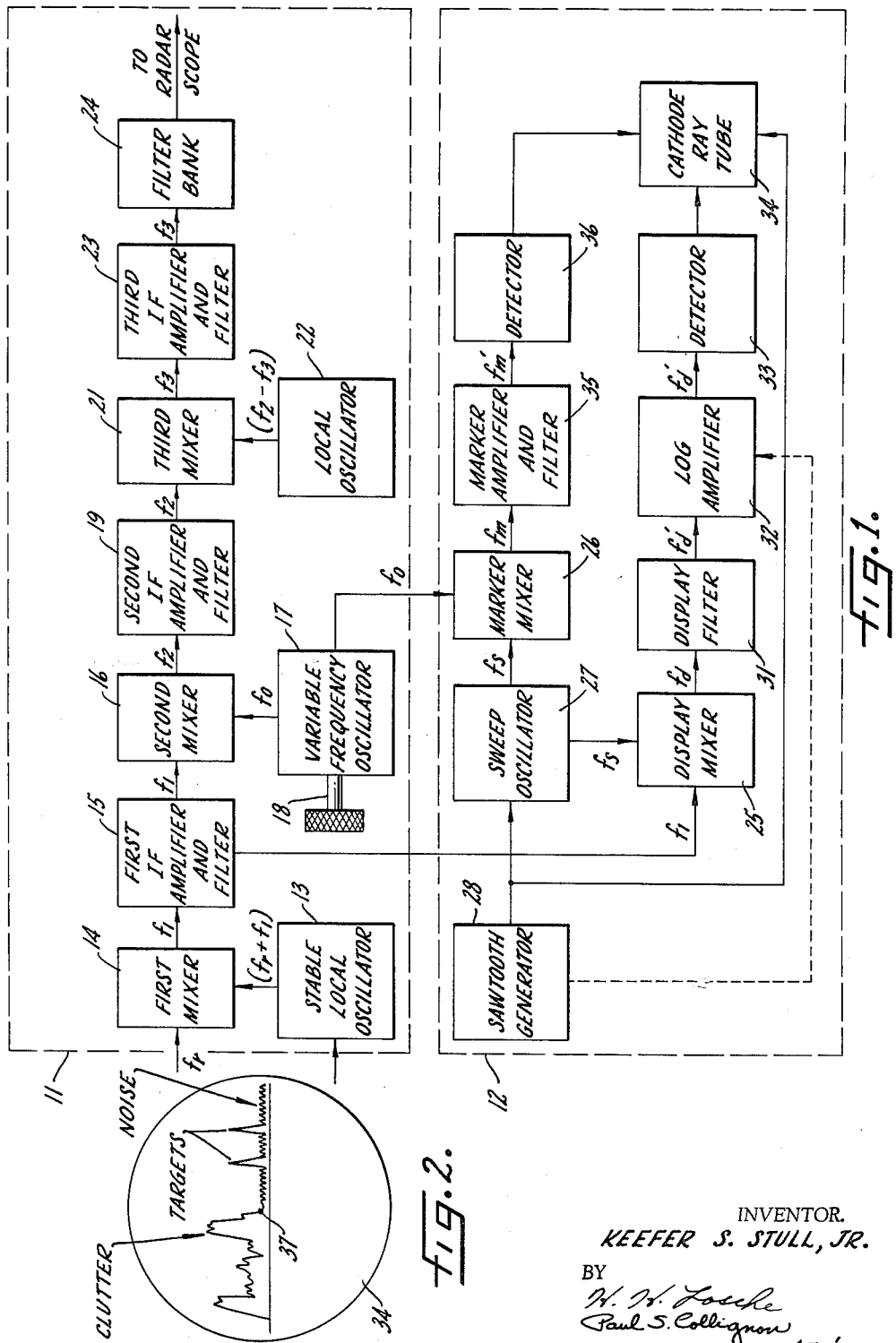

3,209,354
RADAR CLUTTER ELIMINATOR
Keefer S. Stull, Jr., Baltimore, Md., assignor, by mesne assignments, to the United States of America as represented by the Secretary of the Navy
Filed Apr. 23, 1962, Ser. No. 190,204
2 Claims. (Cl. 343—7.7)

The present invention relates to a method and apparatus for eliminating radar clutter and more particularly to a method and apparatus that permits the optimum adjustment of a clutter rejection circuit in a pulse doppler radar receiver.

Radar echo signals from water, ground, or stationary objects result in strong indications on a radar scope, and these indications are usually referred to as clutter or clutter signals. Clutter differs from noise voltages in that noise voltages are random in nature whereas clutter is repeated from scan to scan on the radar scope.

Various methods and devices are known for suppressing or eliminating clutter. One widely known method of suppressing clutter is that of sensitivity time control. In this method the sensitivity of the radar receiver is reduced, during the initial part of the receiving time, below the level at which the clutter echoes are being returned. Beyond the clutter range the sensitivity is again returned to normal. During the time interval in which the signals are being received from the clutter range only the target echoes producing stronger return signals than that of the clutter are presented on the radar scope. The disadvantage of the sensitivity time control method is that target signals of equal or lesser magnitude than the clutter echo are also below the operating range of the less sensitive receiver and thus are lost as well as the clutter.

In the present invention, a radar transmitter sends out a pulsed microwave signal at a high pulse repetition frequency and a medium duty factor. In the interval between transmitted pulses, echoes from both moving targets and stationary objects (clutter) will be received simultaneously. The signal return from each object will have a line spectrum with a line separation equal to the pulse repetition frequency, however, the signal from each object will be doppler shifted from the transmitted signal by an amount proportional to the relative velocity between the radar and the object. In general, this velocity is different for each object and therefore each spectral line may be spread over a certain bandwidth.

In the radar receiver of the present invention, a first IF amplifier is provided with a bandpass filter which is used to select the doppler shifted central spectral line only. The maximum doppler shift of the clutter return is determined by the ground speed of the airborne radar. It is desirable to reject all clutter returns and to receive all target returns which have a doppler shift greater than the maximum clutter shift. However, since the maximum clutter shift varies with the ground speed of the radar, an adjustable bandpass filter must be used to select the desired target passband. This is accomplished by beating down to a lower IF frequency using a variable frequency oscillator and a fixed single-sideband filter at the second IF frequency. The problem then is to adjust the variable frequency oscillator so that the maximum clutter frequency is just equal to the sharp cutoff edge of the single-sideband filter so that all clutter falls outside the passband and all signals fall within the passband. If the setting of the variable frequency oscillator is off in one direction, clutter will be passed and detected as a false target, and if the setting of the variable frequency oscillator is off in the other direction some target signals will be rejected along with the clutter.

In the present invention, there is provided a convenient means of accurately adjusting the variable frequency oscillator and of monitoring the composite received signal spectrum. There is provided a spectrum analyzer with a marker which shows the exact location of the sharp edge of the single-sideband filter. The edge of the clutter can be easily recognized on the spectral display and the variable frequency oscillator can be adjusted to place the marker at this point, thus, properly setting the variable frequency oscillator for optimum clutter rejection.

It is therefore a general object of the present invention to provide an improved method of suppressing clutter in a radar system.

Another object of the present invention is to provide a visual indicator for adjusting the setting of a variable frequency oscillator thereby eliminating the presentation of clutter on a radar scope.

A further object of the present invention is to provide a spectrum analyzer that shows both clutter and moving targets and has a marker for showing the exact location of the sharp edge of a single-sideband filter.

Other objects and advantages of the present invention will be readily appreciated as the same becomes better understood by reference to the following detailed description when considered in connection with the accompanying drawings wherein:

FIGURE 1 is a block diagram showing one embodiment of the present invention; and FIGURE 2 is a graphical illustration showing pulse information on a radar scope.

Referring now to FIGURE 1 of the drawing, a basic pulse doppler radar receiver 11 is shown, and an auxiliary circuit 12 is connected to receiver 11 for providing a convenient means for adjusting receiver 11 so that clutter will be eliminated on the radar scope. A received signal ($f_r$), which has both useful target signals and clutter signals, and a signal, ($f_r+F_1$), provided by a stable local oscillator 13, are presented to a first mixer 14, the output ($f_1$) of which is fed to a first IF amplifier and filter 15. The output ($f_1$) of the amplifier and filter 15 is fed to a second mixer 16, which also is fed an input frequency ($f_0$) from a variable frequency oscillator 17. A manual control 18 is provided on the variable frequency oscillator 17 for adjusting the output frequency of the oscillator.

The output ($f_2$) of the second mixer 16 is provided as an input to the second IF amplifier and filter 19, and the output of the second IF amplifier and filter 19 is provided as an input to the third mixer 21. A local oscillator 22 provides a second input ($f_2-f_3$) to the third mixer 21. The output ($f_3$) of the third mixer 21 is then fed through a third IF amplifier and filter 23 and filter bank 24 to a radar scope.

An output ($f_1$) from the first IF amplifier and filter 15 is fed to a display mixer 25, and an output ($f_0$) from the variable frequency oscillator 17 is fed to a marker mixer 26. A sweep oscillator 27, which receives an input from a sawtooth generator 28, provides a second input for both the marker mixer 26 and the display mixer 25. The output of the display mixer 25 is then passed through a narrow bandpass display filter 31 and then amplified in a logarithmic amplifier 32 to decrease the dynamic range. This signal is detected by detector 33 and then fed to the vertical deflection plates of a cathode ray tube 34. A blanking pulse, which is provided by a sawtooth generator 28, is applied to the logarithmic amplifier 32 and produces a zero base line on the display of the cathode ray tube 34. An output from the sawtooth generator output is fed to the horizontal plates of cathode ray tube 34. The display on cathode ray tube 34 is that of a conventional spectrum analyzer, as shown in FIGURE 2 of the drawing. The output ($f_s$) of the sweep oscillator 27 and the output ($f_0$) of the variable frequency oscillator 17 are beat together in the marker mixer 26 and the difference frequency is passed through a narrow bandpass filter and amplifier 35. This signal is detected by detector 36 and then fed to cathode ray tube 34 to intensify the display to mark, by marker 37, the location of the edge of the single-sideband filter.

In order for the marker 37 to appear at the proper place on the display of the cathode ray tube 34, it is necessary that certain relationships exist among the various filter frequencies.

The following relationships exist:

(1) $\quad f_2 = f_1 - f_0$
(2) $\quad f_d = f_1 - f_s$
(3) $\quad f_m = f_s - f_0$ where $f_0$ = output frequency of the variable frequency oscillator 17;
$f_1$ = output frequency of first mixer 14;
$f_2$ = output frequency of second mixer 16;
$f_s$ = sweep oscillator 27 frequency;
$f_d$ = output frequency of display mixer 25;
$f_m$ = output frequency of marker mixer 26;
$f'_2$ = frequency of sharp edge of single-sideband filter in second amplifier and filter 19;
$f'_d$ = center frequency of display filter 31;
$f'_m$ = center frequency of marker filter 35;

As the sweep oscillator 27 scans, the marker 37 appears when:

(4) $\quad f'_m = f_s - f_0$

At this time, the output of the display filter 31 is:

(5) $\quad f'_d = f_1 - f_s$

Combining Equations 4 and 5 gives:

(6) $\quad f'_m + f'_d = f_1 - f_0$

At this time, in order for the marker 37 to be properly located on the display of the cathode ray tube 34, it is necessary that:

(7) $\quad f_2 = f'_2$

The required filter relationship is obtained by combining Equations 6 and 7, which gives:

(8) $\quad f'_m + f'_d = f'_2$

In one military radar receiver, a typical value used for $f'_2$ was 1,929 kc. and the value used for $f'_d$ was 455 kc. This required that $f'_m$ be 1,474 kc.

In operation, a transmitter sends out a pulsed microwave signal at a high pulse repetition frequency and medium duty factor. In the interval between transmitted pulses, the echoes from both moving targets and from stationary objects (clutter) are received simultaneously. The signal return from each object will have a line spectrum with a line separation equal to the pulse repetition frequency. The signal from each object will be doppler shifted from the transmitted signal by an amount proportional to the relative velocity between the radar and the object.

The received signal ($f_r$), which has both useful target signals and clutter signals is provided as an input to the radar receiver 11, which has a clutter rejection circuit. As the maximum clutter shift varies with the ground velocity of the radar, an adjustable bandpass filter is provided to select the desired target passband. The output ($f_1$) of the first amplifier and filter 15 is mixed in the second mixer 16 with an output from the variable frequency oscillator. When the output ($f_2$) from the second mixer 16 is equal to the sharp cutoff edge of the single-sideband filter ($f'_2$), all clutter will fall outside the passband and all signals will fall within said passband.

The filtered output ($f_1$) of amplifier and filter 15 is fed into the display mixer 25 and beat with a sweep oscillator 27 which is swept by the output of the sawtooth generator 28. As the sweep oscillator slowly sweeps through the range, the output of the display filter effectively scans the output spectrum of the first IF amplifier. The filtered output is then amplified in a logarithmic amplifier to decrease the dynamic range. This signal is then detected and fed to the vertical deflection plates of a cathode ray tube 34. The output of the sawtooth generator 28 is fed to the horizontal plates of a cathode ray tube 34. This creates a conventional spectrum analyzer display as shown in FIGURE 2 of the drawing.

The output of the sweep oscillator 27 and an output from the variable frequency oscillator 17 are beat together in the marker mixer 26. The difference frequency is passed through a narrow bandpass filter and amplifier 35, and this signal is then fed to the grid of the cathode ray tube 34 to intensify the display to mark the location of the single-sideband filter. By turning the manual control 18 of the variable frequency oscillator 17, the position of the marker 37 can be changed, and when the marker 37 is positioned at the edge of the clutter which is displayed on the cathode ray tube, the maximum clutter frequency is just equal to the sharp cutoff edge of the single-sideband filter and all clutter falls outside the passband, and all target signals fall within the passband. Thus it can be seen that no clutter will be presented to the main radar scope.

Obviously many modifications and variations of the present invention are possible in the light of the above teachings. It is therefore to be understood, that within the scope of the appended claims, the invention may be practiced otherwise than as specifically described.

What is claimed is:

1. In a pulse doppler radar receiver having an adjustable clutter rejection circuit, an auxiliary circuit for enabling optimum adjustment of said adjustable clutter rejection circuit comprising:
   a source of video signals including useful target signals and undesirable clutter signals,
   a first cathode ray display means coupled to said video signals through said adjustable clutter rejection circuit for displaying said target signals thereon,
   a second spectrum analyzer cathode ray display circuit coupled to said video signals for displaying the composite received signal spectrum including both said useful target signals and said undesirable clutter signals in a spectral line display,
   electronic means connected between said radar receiver and said second spectrum analyzer cathode ray display circuit for generating a movable visual marker on the cathode ray display means therein, and
   manually adjustable variable frequency oscillator control means coupled to said electronic means for positioning said visual marker on the face of said cathode ray display means in a particular manner with respect to said spectral line display whereby said positioning of said visual marker determines the optimum adjustment of said adjustable clutter rejection circuit causing it to remove said undesirable clutter signals from said video signals passed to said first cathode ray display means leaving only target signals for display thereon.

2. In a pulse doppler radar receiver having an adjustable clutter rejection circuit, an auxiliary circuit for enabling optimum adjustment thereof comprising:
   a source of video signals including useful target signals and undesirable clutter signals,
   a fixed single sideband filter,
   a manually adjustable variable frequency oscillator coupled to said filter,
   an auxiliary spectrum analyzer cathode ray display circuit coupled to said source of video signals for displaying the composite received signal spectrum including both said useful target signals and said undesirable clutter signals in a spectral line display, and
   means coupling said manually adjustable variable frequency oscillator and said auxiliary spectrum analyzer cathode ray display circuit for generating a visual marker on the cathode ray display means in said display circuit whereby a frequency change in the output of said manually adjustable variable frequency oscillator causes a corresponding change in the position of said visual marker on said cathode ray display means.

References Cited by the Examiner

UNITED STATES PATENTS 2,653,312   9/53   Haworth _____ 343—11

CHESTER L. JUSTUS, *Primary Examiner.*